United States Patent [19]

Muscat

[11] Patent Number: 5,046,767
[45] Date of Patent: Sep. 10, 1991

[54] CONVERTIBLE TOP LATCHING MECHANISM

[75] Inventor: Mario Muscat, Livonia, Mich.
[73] Assignee: Jubbu Designer's Inc., Plymouth, Mich.
[21] Appl. No.: 450,234
[22] Filed: Dec. 13, 1989
[51] Int. Cl.5 .............................................. E05C 9/02
[52] U.S. Cl. .................... 292/34; 292/DIG. 5
[58] Field of Search .................... 296/120.1, 121, 224, 296/120; 292/34, 36, 7, 170, 40, 165, DIG. 5, 302

[56] References Cited

U.S. PATENT DOCUMENTS

| | | | |
|---|---|---|---|
| 1,856,531 | 5/1932 | Berg | 292/40 |
| 1,929,371 | 10/1933 | Hamilton | 292/40 X |
| 2,360,524 | 10/1944 | Simpson | 292/DIG. 5 X |
| 2,570,260 | 10/1951 | Milhan | 296/120 |
| 2,586,648 | 2/1952 | Hale et al. | 296/120 |
| 2,709,621 | 5/1955 | Votypka et al. | 292/DIG. 5 X |
| 2,831,718 | 4/1958 | Hallek et al. | 292/48 |
| 3,151,375 | 10/1964 | Schevenell | 292/302 X |
| 3,362,740 | 1/1968 | Burns | 292/34 |
| 3,425,742 | 2/1969 | Rauber, Jr. | 296/121 |
| 4,470,277 | 9/1984 | Uyeda | 292/34 X |
| 4,830,425 | 5/1989 | Muscat | 292/34 |

Primary Examiner—Richard E. Moore
Attorney, Agent, or Firm—John R. Benefiel

[57] ABSTRACT

A convertible top latching mechanism in which blade shaped tangs each have a recess formed with a sloping cam surface mating with a surface on an associated sliding operating rod to pull the tang into an opening in a locking housing. A vertically swingable handle moves respective operating links horizontally to each cause sliding movement of a connected operating rod by a pin and slot arrangement.

2 Claims, 4 Drawing Sheets

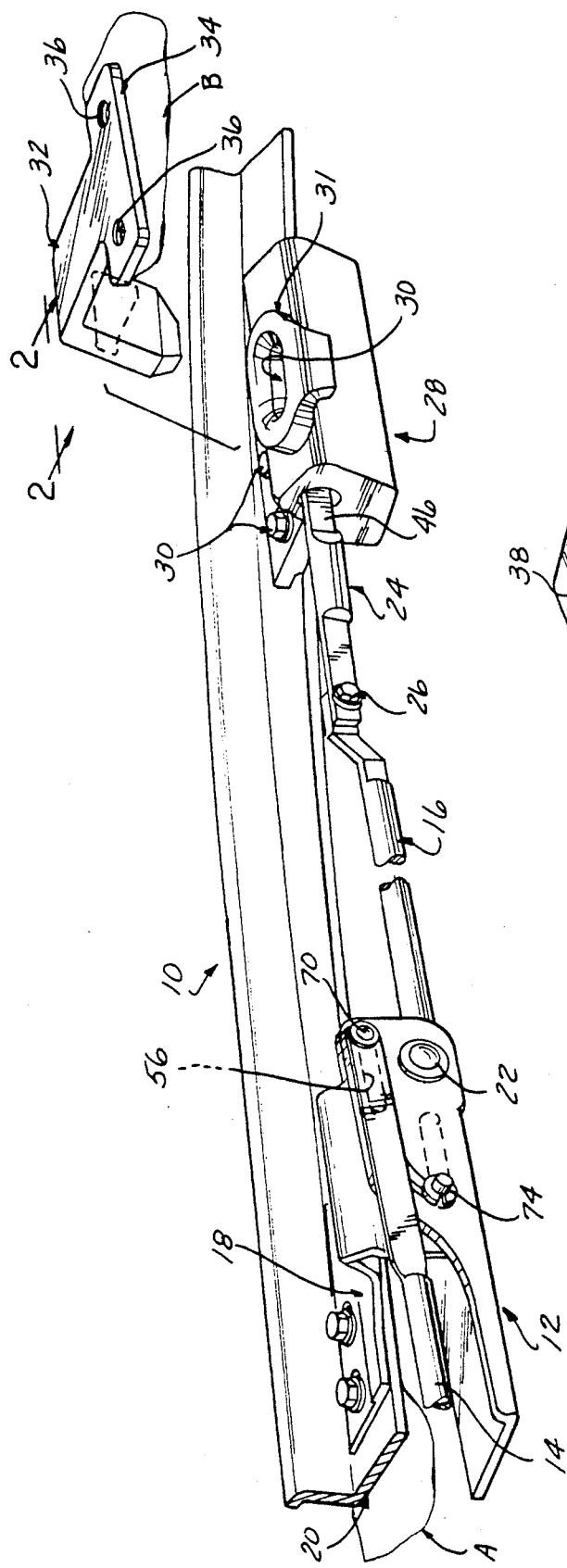

CONVERTIBLE TOP LATCHING MECHANISM

This invention relates to convertible top latching mechanisms adapted to draw the header member of the top frame securely onto the windshield frame, compressing the interposed weatherstripping.

The mechanism described therein comprises a pair of flat bars each carrying a wedge shaped ramp piece and each ramp piece cooperates with a cutaway recess in a respective one of a pair of downwardly projecting pins fixed to the header. Rotation of a central pivot plate by a long handle drives the bars to cam the pins and header down atop the windshield frame upper member.

That design is relatively bulky and complex, and a good deal of sliding friction is generated by the flat bars moving through guide brackets, requiring a long operating handle to reduce the effort required to overcome this friction.

Another disadvantage is the horizontally swinging handle since the components must be exposed to clear the header trim, presenting an impact hazard for the occupants of the vehicle.

SUMMARY OF THE INVENTION

The present invention comprises an improvement to the latching mechanism described above, in which relatively broad, sturdy locking tang pieces are provided in which an inclined cam contour is formed extending across a cutaway recess formed in a tang portion, with a cutaway in an associated actuating rod forming a surface engaged with each tang cam surface to perform a draw down camming action. This arrangement provides a much more compact structure than with the cam surface formed on an operating bar. The ramp cutaway contour is formed with detent horizontal flat surfaces on either side of a sloping main cam surface, which detents tend to lock the tang securely in a receiving opening in a locking housing and prevent escape of the locking tang pieces both in the initially inserted and fully locked condition of the mechanism. Positive release movement of the handle is required to release the locking tang pieces in either instance.

The operating rod is received in a horizontal bore extending across to be slidably supported therein with minimum friction.

An operating link is pinned to each operating rod, with a central, downwardly swingable handle causing extension and retraction of the operating rods by a pin and slot mechanism acting between the handle and on adjacent fixed support bracket.

A greatly simplified and more compact mechanism results, operating more easily and smoothly, and with fewer exposed parts.

DESCRIPTION OF THE DRAWINGS

FIG. 1 is a fragmentary perspective view of the main components of the latching mechanism according to the present invention.

FIG. 2 is an enlarged perspective reverse view of the locking tang piece shown in FIG. 1, in the direction of the arrows 2—2.

DETAILED DESCRIPTION

Figure 3:
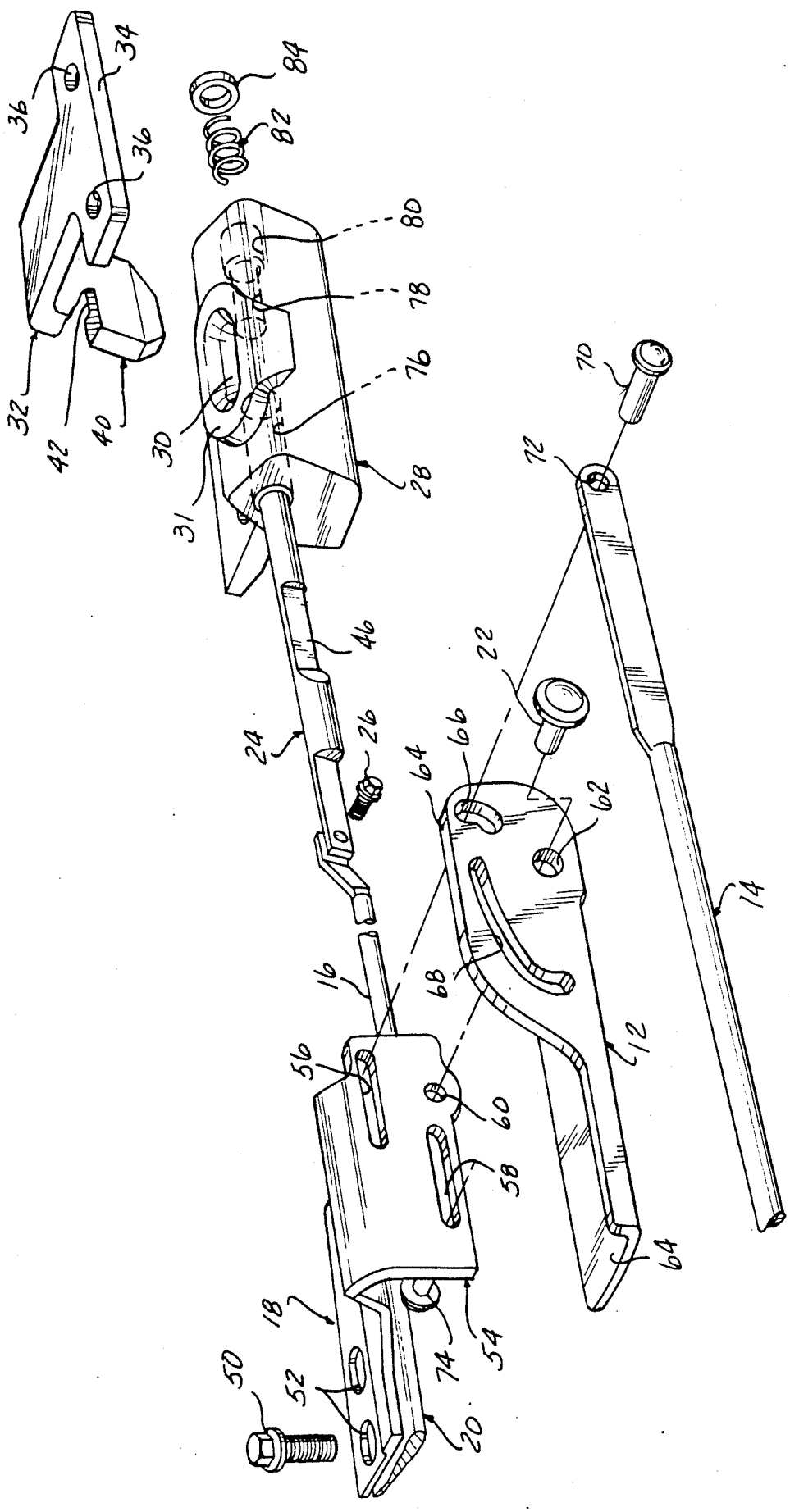
FIG. 3 is an exploded perspective view of the components shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

FIG. 1 is a view from the inside of a convertible top vehicle of the right hand side of a latching mechanism in which vehicle a complete mechanism is installed.

The mechanism 10 includes a central, downwardly pivotable handle 12 having a left and right hand operating links 14, 16 drivingly connected thereto at the inside end of each.

A support bracket 18 is secured to a stationary member 20 fixed to the windshield frame (A) and supports the handle 12 for rotation about a pivot pin 22 so as to swing in a vertical plane, i.e., to be pulled down and pushed up to release and lock the convertible top respectively. The operating links 14, 16 are adapted to be pushed outwardly and drawn inwardly as the handle is pulled down and pushed up respectively. This in-and-out movement of the operating links 14, 16 is transmitted to a respective one of a pair of operating rods, only the right hand rod 24 shown in FIG. 1, by means of a pinned connection 26.

The operating rod 24 is slidably mounted for horizontal movement in a lock housing 28.

The lock housing 28 is formed with a generally downwardly extending oblong opening 30, a wear bushing 31 inserted therein and having a rounded entry contour serving to guide the insertion of a locking tang piece 32. Locking tang piece 32 has a bracket plate 34 having holes 36 enabling attachment with threaded fasteners to a convertible top header (B) which descends down towards the frame member 20 as the top is being put up. The lock housing 28 is fixed to the frame member 20 as with bolts 38.

According to the concept of the present invention, a relatively wide blade shaped tang 40 on the locking tang piece 32 is formed with a cutaway 42 recessed into the forward face thereof, the lower left side of the cutaway defining a cam surface 44 extending across the width of the tang 40, which itself is positioned with its wide side extending side to side. The camming surface 44 has a lower horizontally extending latching detent surface 44a, a sloping main camming surface 44b and an upper horizontally extending latching surface 44c, which each interact with a cutaway recess 46 formed in the operating rod 24 to draw down the locking tang piece 32 (facing the attached header) onto the windshield frame.

This action is accomplished by the in and out movement of the operating rods induced by the in and out movement of the operating legs 14, 16, as the handle 12 is manipulated.

FIG. 3 illustrates further constructional details of these components. The bracket 18 is attached by means of threaded bolts 50 received in elongated adjustment slots 52 and thence into the frame member 20. The bracket 18 is formed with a depending slotted plate portion 54, formed with a right hand side horizontal slot 56 and a lower left hand horizontal slot 58 as well as a pin hole 60 receiving the stem of the mounting pin 22 through an aligned hole 62, and a handle 12. The handle 12 is formed with a slot plate portion 64 extending vertically and positioned against the rear face of the slot plate portion 54 of the support bracket 18.

A generally horizontally extending flat handle portion 64 is adapted to be swung up against the lower edge of the slot plate portion 54 of the support bracket 18. The handle slot plate portion 64 is formed with a relatively small arcuate right hand slot 66 and a much longer left hand generally more gradual arcuate slot 68. The shorter arcuate slot 66 receives a pin 70 passing through the inside and through a hole 72 in the inside end of the left hand operating length 14 which also passes through the slot 56 of the support bracket slotted plate portion 54. A connector pin 74 is similarly received through the end of operating link 16 through a hole in the out board end of the operating link 16 which passes thus through the lower left hand slot 58 and then through the larger downwardly gradually arcuate slot 68 and the handle slot plate portion 64.

The lock housing 28 is formed with a pair of bores 76 and 78 which slidably receive the round diameter portions of the operating rod 24 on either side of the cut away recess. The bores 76 and 78 lie on either side of the oblong opening 30 so that the operating rod 24 is supported on both sides. A counter bore 80 is also formed adjacent the far outer side of the lock housing 28 to receive a bias spring 82 compressed therein by means of a threaded cap 84 such as to urge the operating rod 24 inwardly for purposes that will be described hereinafter.

Figure 4:
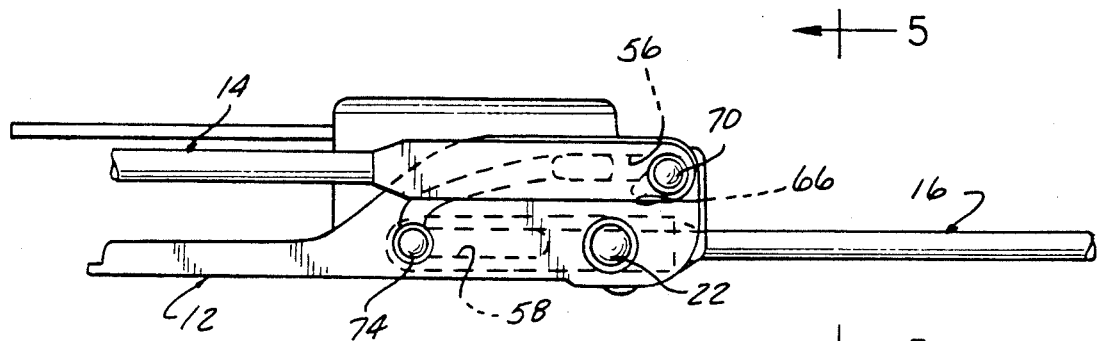
FIG. 4 is a front elevational view of the handle and related components shown in FIGS. 1 and 3 in the fully latched position.
Figure 5:
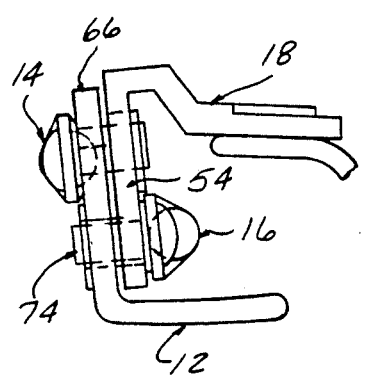
FIG. 5 is an endwise view of the handle and related components shown in FIG. 4.
Figure 6:
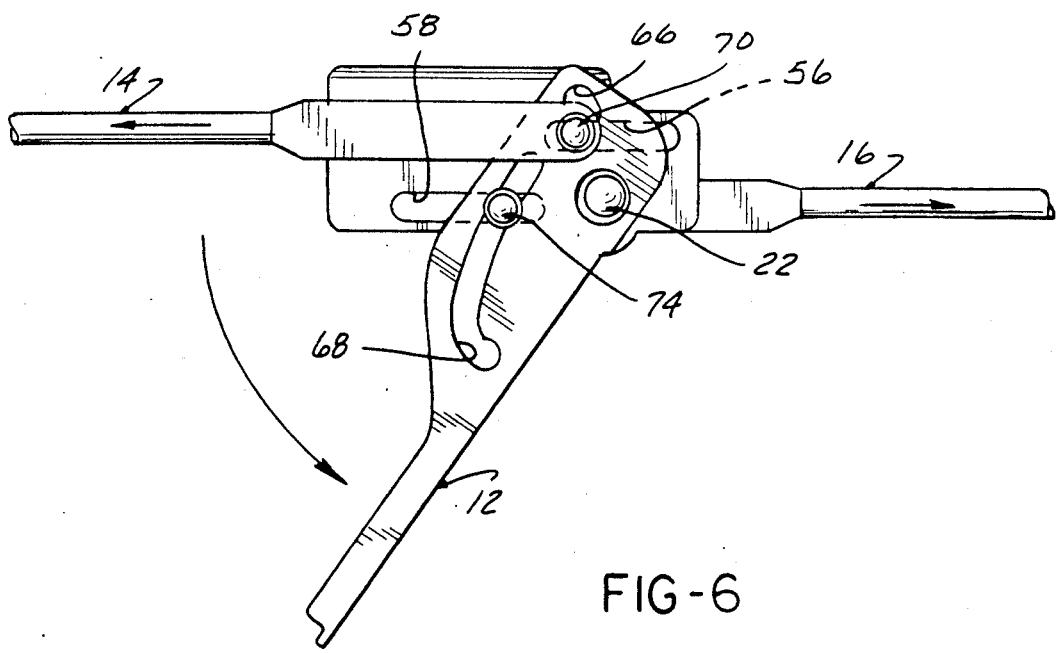
FIG. 6 is a front elevational view of the handle and related components shown in FIGS. 4 and 5, in the released position.

Referring to FIGS. 4 thru 6 the operation of the handle 12 and the operating links 14 and 16 is further illustrated. The fully locked position is shown in FIG. 4, the handle 12 swung up to the horizontal position in which position the operating pin 70 has been forced to the extreme rightward position in the upper slot 56 as the handle slot 66 is swung upwardly with the pivoting swinging movement of the handle 12. The shorter arcuate slot 66 accommodates the relative vertical movement of the handle 12 during this movement.

Conversely, the right hand operating pin 74 has been forced to the extreme rightmost end of the slot 58. The larger arcuate slot 68 acts on the pin 74 as the handle 12 is rotated up to cam the same to this position. The vertical component of the slot 68 accomodating the vertical component of the movement of the handle 12 as this swinging movement takes place, such that the operating links 14, 16 are drawn inwardly in a substantially horizontal direction as the handle 12 is flipped up to the locking position.

As seen in FIG. 5, the operating links 14, 16 are located on either side of the slot plate portion 54 of the support bracket 18, and the slot bracket 66 of the handle 12.

To release, the handle 12 is pulled vertically downwardly, as shown in FIG. 6, forcing the operating links 14, 16 outwardly by constraining the pins 70, 74 respectively to be forced towards each other in the slots 56, 58 respectively. The arcuate slots 66, 68 accomodating the vertical component of the swinging motion of the handle 12 to thus maintain a substantial horizontal movement of the operating links 14, 16.

Figure 7:
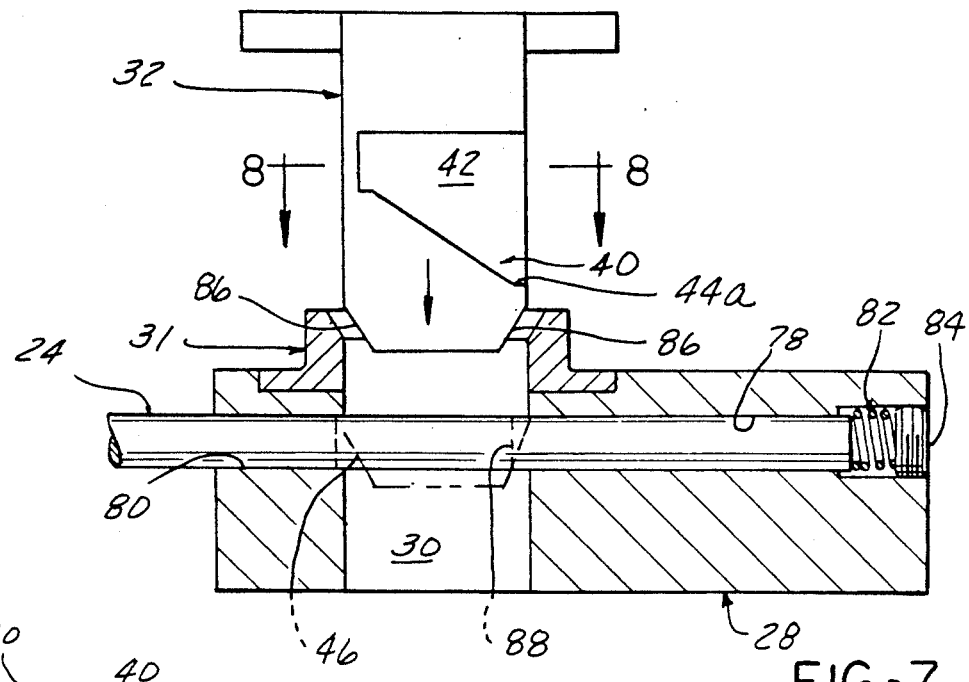
FIG. 7 is a rear elevational view of a locking tang and associated operating rod, and a sectional view of a mating receiving opening, as the locking tang is being inserted therein.
Figure 8:
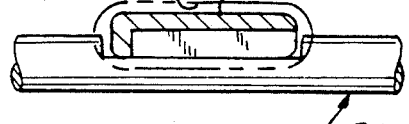
FIG. 8 is a view of the section 8—8 taken in FIG. 7.
Figure 9:
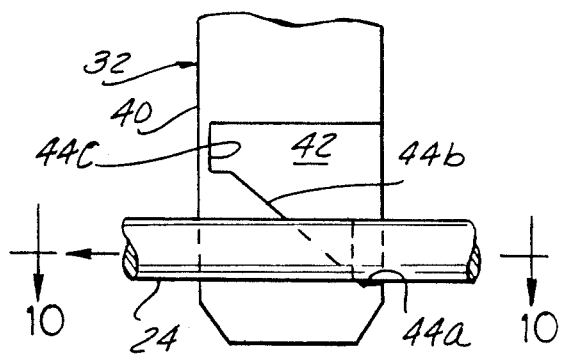
FIG. 9 is a rear elevational view of the locking tang and operating rod moved slightly from in the initial inserted position.
Figure 10:
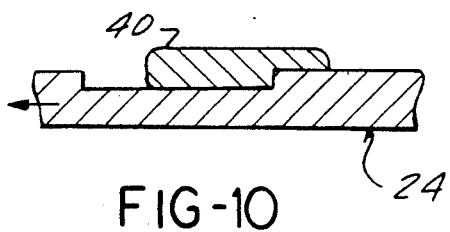
FIG. 10 is a view of the section 10—10 taken in FIG. 9.

Referring to FIGS. 7-12, the camming action between the right hand operating rod 24 and locking tang piece 40 is illustrated. In FIG. 7 the right operating rod 24 is in its outer most or released position. In this position, camming edge surface 88 of recess 46 is positioned slightly off center with respect to the oblong opening 30 in the locking housing 28 by action of the spring 82 urging the operating rod 24 to the left as viewed in FIG. 7. The leading edge of the tang portion 40 of the locking tang piece 32 is formed with sloping entry cam surfaces 86 which serve to guide the tang portion 40 into the opening 30 but also to cam the operating rod 24 to slightly the right as viewed in FIG. 7. One of the surfaces 86 comes into contact with the side wall 88 of the recess 46 upon continued movement of the tang portion into the oblong opening 30. As the tang portion 40 descends a sufficient distance the operating rod 24 will pass above the latching detent surface 44a, and the spring 82 will snap the operating rod 24 back to the left as viewed in FIG. 9. In this position the tang portion 40 and locking piece 32 generally is secured against retraction out of the opening 30 by the presence of the detent surface 44a, release requiring a positive releasing movement of the operating rod 24 to the right or outwardly by manipulation of the handle 12.

Accordingly after initial insertion of the tang portion 40 there is a securement of the header B to the windshield frame A which cannot be released without a positive releasing movement action of the handle 12.

Figure 11:
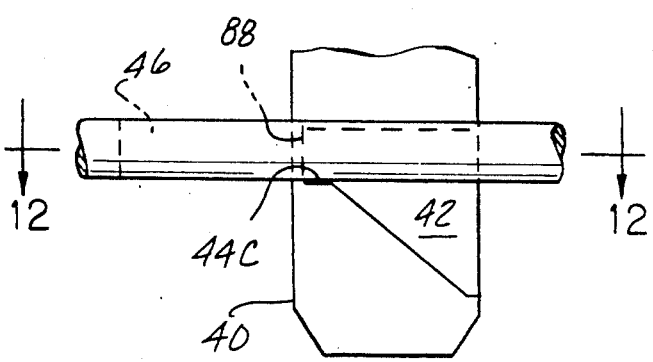
FIG. 11 is a rear elevational view of the locking tang and operating rod advanced to the fully latched, detented position.
Figure 12:
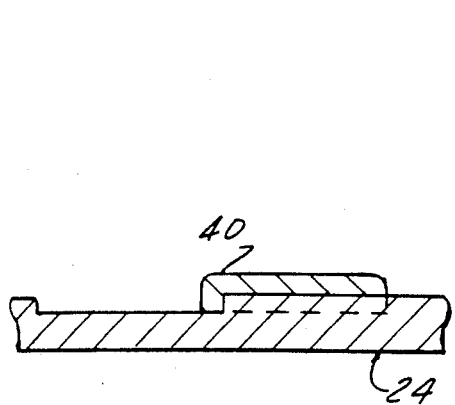
FIG. 12 is a view of the section 12—12 taken in FIG. 11.

Upon pivoting movement of the handle 12 in a direction so as to draw the right hand operating rod 24 inwardly and to the left as viewed in FIG. 11, a camming action occurs on the main camming surface 44b. This is since the right hand operating rod 24 is secured in bores 78, 80 to resist vertical reaction movement of the tang 40 and locking tang piece 32 as the camming action occurs.

Thus, the header B is drawn down onto the windshield frame A, as the operating rods are drawn inwardly by continued upward pivoting movement of the handle 12 until a fully locked position is achieved. This is illustrated in FIG. 11, in which the cut away recess 46 has the trailing edge surface 88 of the cut away recess 46 is moved completely to the left as viewed in FIG. 11, against the end wall 44c of the cut away tang recess 42. With the locking detent 44c positively preventing withdrawal of the tang portion 40 from the opening 30.

In order to accomplish release a positive action of the handle 12 is required, at the same time an over center condition exists with the pin and slot connections of the operating links 14, 16 respectively. Such as to block the handle 12 in the fully locked position, thus an extremely secure retention of the mechanism in the fully locked position is insured.

I claim:

1. A convertible top latching mechanism for drawing together a header member for a convertible top frame and an upper windshield frame member including;

a locking housing attached to one of said members;

an operating rod extending horizontally within said locking housing for sliding movement therein;

said locking housing formed with a generally verticals opening extending to intersect the path of said operating rod movement therein;

a locking tang piece attached to the other of said members and having a generally vertically extending blade shaped tang aligned to enter said locking housing opening as said header is moved towards said upper windshield frame member;

said operating rod having an intermediate segment cutaway recess located to pass into said opening during said sliding movement in said locking housing, said cutaway recess bounded on either side by adjacent surfaces formed by said cutaway recess;

said tang having a cutaway recess formed with a sloping cam surface extending across the width of said tang and engagable with one of said adjacent surfaces on said operating rod said cutaway recess, said rod surface configured to act on said sloping cam surface to draw said tang further into said housing opening upon sliding movement of said operating rod in one direction;

handle means selectively movable to cause sliding movement of said operating rod in said one direction in said locking housing to cause camming of said tang into said opening and drawing together of said header and upper windshield frame members said tang formed with a horizontal latching detent surface adjacent one end of said sloping cam surface of said tang cutaway recess;

means spring biasing said operating rod to a position whereat said surface adjacent said cutaway recess of said operating rod overlies said latching detent surface; and, said tang formed with outer slopping side surface operable to engage said operating rod surface and cam the same against said spring bias, said operating rod moved back by said spring bias means to position said operating rod adjacent surface overlying said detent surface upon bringing said tang into said opening to sufficient extent to allow said operating rod adjacent surface to enter said cutaway recess in said tang, thereby locking said members together.

2. The convertible top latching mechanism according to claim 1 further including a horizontal locking detent surface located at the other end of said sloping cam surface, said operating rod surface moving over said locking detent surface upon continued movement of said operating rod in said housing to a fully latched position, whereby detenting said operating rod in a fully latched position.

* * * * *